US009720651B2

(12) United States Patent
Fleischer et al.

(10) Patent No.: US 9,720,651 B2
(45) Date of Patent: Aug. 1, 2017

(54) STRATEGY MAINTENANCE SYSTEM

(71) Applicant: Bank of America Corporation, Charlotte, NC (US)

(72) Inventors: Michael D. Fleischer, Double Oak, TX (US); Tonya L. Grimes, Smyrna, DE (US); Prasanna Jayachandran, Frisco, TX (US); Adam S. Jones, Landenberg, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/799,654

(22) Filed: Jul. 15, 2015

(65) Prior Publication Data

US 2017/0017468 A1 Jan. 19, 2017

(51) Int. Cl.
*G06F 9/44* (2006.01)
*G06Q 10/06* (2012.01)

(52) U.S. Cl.
CPC .......... *G06F 8/20* (2013.01); *G06Q 10/0637* (2013.01)

(58) Field of Classification Search
CPC .............................. G06F 8/20; G06Q 10/0637
USPC ........................................................ 717/102
See application file for complete search history.

(56) References Cited

U.S. PATENT DOCUMENTS

| | | | | |
|---|---|---|---|---|
| 5,339,430 A | * | 8/1994 | Lundin | G06F 8/67 |
| | | | | 712/E9.082 |
| 8,744,890 B1 | * | 6/2014 | Bernier | G06Q 10/0631 |
| | | | | 705/7.11 |
| 2005/0096950 A1 | * | 5/2005 | Caplan | G06Q 10/06314 |
| | | | | 705/7.24 |
| 2005/0246303 A1 | * | 11/2005 | Kumar | G06F 17/30637 |
| | | | | 706/47 |
| 2006/0095882 A1 | * | 5/2006 | Mankin | G06F 17/5045 |
| | | | | 716/137 |
| 2006/0218053 A1 | * | 9/2006 | Jimenez | G06Q 10/0637 |
| | | | | 705/7.36 |
| 2007/0100859 A1 | * | 5/2007 | Holmes | G06Q 10/06 |
| 2010/0262443 A1 | * | 10/2010 | D'Albis | G06Q 10/0637 |
| | | | | 705/7.36 |
| 2011/0119106 A1 | * | 5/2011 | Dahl | G06Q 10/06 |
| | | | | 705/7.28 |

(Continued)

OTHER PUBLICATIONS

Blaze Advisor Tutorial (BRMS), http://www.blazeadvisortutorial.com, Jul. 22, 2012. downloaded Oct. 19, 2015, 4 pages.

(Continued)

*Primary Examiner* — Lewis A Bullock, Jr.
*Assistant Examiner* — Theodore Hebert
(74) *Attorney, Agent, or Firm* — Michael A. Springs

(57) ABSTRACT

A strategy-maintenance system comprises a memory, an interface, and a processor. The system is operable to store a plurality of templates. A template comprises a statement that facilitates writing one or more strategies. The system may further communicate to a first computer the plurality of templates for presentation on a first graphical user interface. The system also receives a first selection of at least one of the plurality of templates for a strategy. The strategy is operable to calculate a key value based on at least one of the plurality of templates. The system finally executes the strategy to calculate the key value and communicates the strategy for execution on a remote machine.

20 Claims, 4 Drawing Sheets

(56) References Cited

U.S. PATENT DOCUMENTS

| | | | | |
|---|---|---|---|---|
| 2011/0230980 A1* | 9/2011 | Hammack | G05B 19/409 | 700/17 |
| 2012/0005115 A1* | 1/2012 | Hofberg | G06Q 10/06 | 705/348 |
| 2013/0041711 A1* | 2/2013 | Girard | G06Q 10/0635 | 705/7.28 |
| 2014/0122377 A1* | 5/2014 | Goodman | G06Q 30/02 | 706/11 |
| 2014/0164350 A1* | 6/2014 | Landa | H04L 67/02 | 707/709 |
| 2014/0189641 A1* | 7/2014 | Anderson | G06F 8/60 | 717/110 |
| 2014/0233719 A1* | 8/2014 | Vymenets | H04M 3/5183 | 379/265.03 |
| 2014/0379435 A1* | 12/2014 | Al-Filali | G06Q 10/06375 | 705/7.37 |
| 2015/0082268 A1* | 3/2015 | Craig | G06F 8/71 | 717/101 |

OTHER PUBLICATIONS

FICO, "What's New in FICO™ Blaze Advisor®, business rules management system," version 6.6, Fair Isaac Corporation, http://fico.com/en/wpcontent/secure_upload/FICO_Blaze_Advisor_Whats_New_v_6_6_2512PS, (c)2006-2009, 2 pages.

* cited by examiner

*← 200B*

Strategy name: SPID65GRAD
Strategy number: 236
Priority: 990
Date: 1/6/15
Version: 1.36

If processing date — card open date    is < 1(month)

Then

Set 0-Key Number-0

Exit Ruleset

*FIG. 2B*

STRATEGY MAINTENANCE SYSTEM

TECHNICAL FIELD

The present invention relates generally to the field of hardware and software development and more particularly to a strategy maintenance system.

BACKGROUND

Large enterprise businesses, such as financial institutions, often utilize third-party entities to assist in performing specialized functions. In the financial institution environment, this includes sending customer data to a third-party entity and the third-party entity provides recommendations to one or more lines of business.

SUMMARY OF EXAMPLE EMBODIMENTS

According to embodiments of the present disclosure, disadvantages and problems associated with technological assessments may be reduced or eliminated.

In certain embodiments, a strategy-maintenance system comprises a memory, an interface, and a processor. The system is operable to store a plurality of templates. A template comprises a statement that facilitates writing one or more strategies. The system may further communicate to a first computer the plurality of templates for presentation on a first graphical user interface. The system also receives a first selection of at least one of the plurality of templates for a strategy. The strategy is operable to calculate a key value based on at least one of the plurality of templates. The system finally executes the strategy to calculate the key value and communicates the strategy for execution on a remote machine.

Certain embodiments of the present disclosure may provide one or more technical advantages. In certain embodiments, a system is operable to receive a selection of one of a plurality of templates for a strategy and communicate the strategy for execution on a remote machine. This technique allows the enterprise to create, edit, and manage a strategy internally before sending to a third-party entity. Thus, this technique conserves bandwidth and memory that would be consumed by communicating each change to a strategy to the third-party entity and requiring the third-party to create, edit, and manage a strategy. In certain embodiments, a system is operable to store and execute a strategy on a local machine to the enterprise. This technique allows the enterprise to test and edit a strategy internally before sending to a third-party entity, thus conserving bandwidth and memory that would be consumed by requiring the third-party entity to test the strategy and report back to the enterprise after each test.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which:

FIG. 2B illustrates an example strategy; and

DETAILED DESCRIPTION

Figure 1:
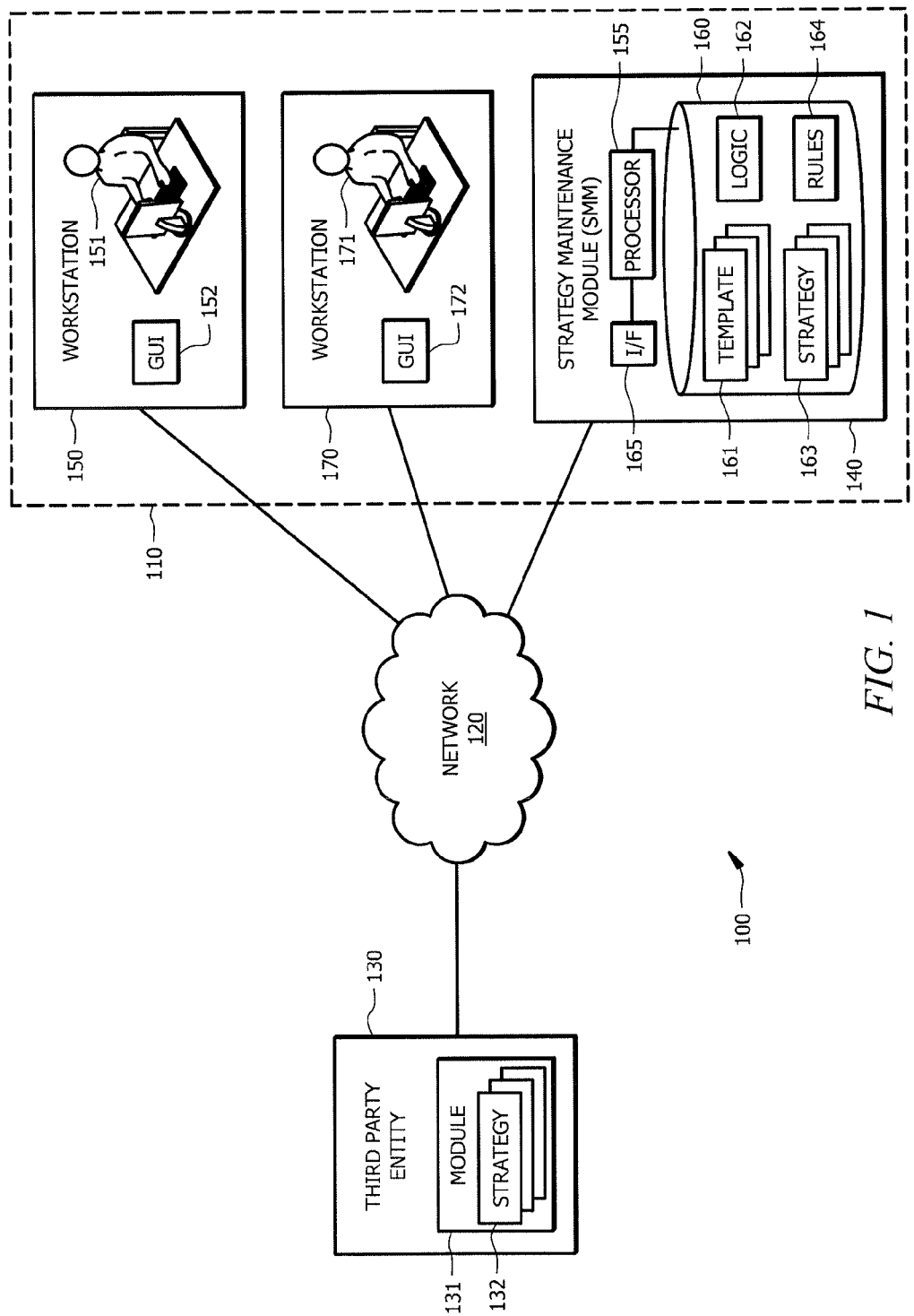
FIG. 1 illustrates an example system that facilitates strategy maintenance.
Figure 2A:
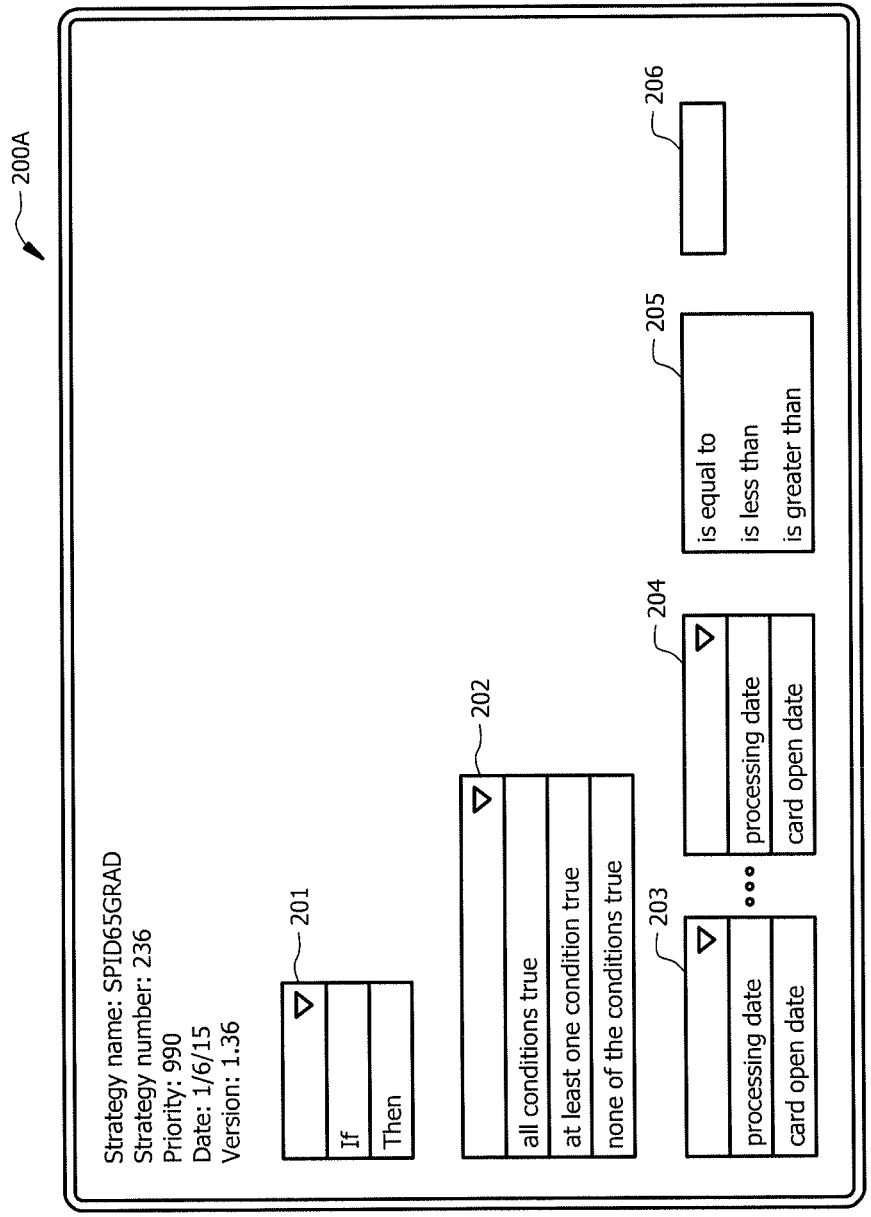
FIG. 2A illustrates an example strategy displaying a plurality of templates for selection.
Figure 3:
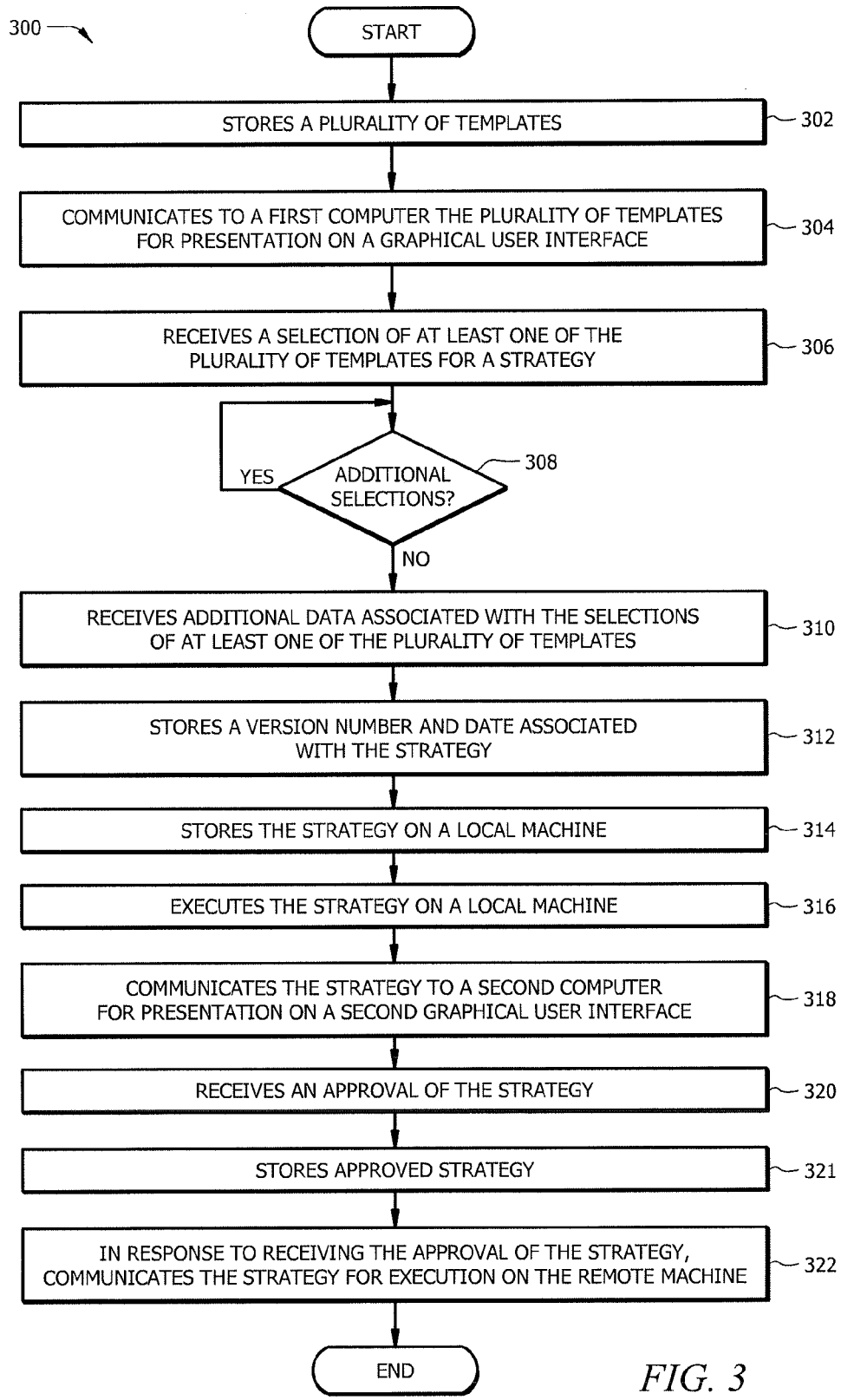
FIG. 3 illustrates an example flowchart for strategy maintenance.

Embodiments of the present invention and its advantages are best understood by referring to FIGS. 1-3, like numerals being used for like and corresponding parts of the various drawings.

FIG. 1 illustrates a system 100 that facilitates strategy maintenance. System 100 may include enterprise 110, administrator workstations 150 and 170, one or more third-party entities 130, and one or more Strategy Maintenance Modules (SMM) 140. Enterprise 110, administrator workstations 150 and 170, third-party entity 130, and SMM 140 may be communicatively coupled by network 120.

In general, SMM 140 facilitates maintaining and updating strategies that third-party entity 130 uses to assist enterprise 110 with certain decisions related to customers of enterprise 110. The system is operable to store a plurality of templates. A template comprises a statement that facilitates writing one or more strategies. The system may further communicate to a first computer the plurality of templates for presentation on a first graphical user interface. The system also receives a first selection of at least one of the plurality of templates for a strategy. The strategy is operable to calculate a key value. The system finally executes the strategy to calculate the key value and communicates the strategy for execution on a remote machine.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. Network 120 may communicatively couple third-party entity 130 with enterprise 110.

In some embodiments, administrator workstations 150 and 170 may refer to any device that facilitates administrators 151 and 171 performing a function in or interacting with system 100. In some embodiments, administrator workstations 150 and 170 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100.

In some embodiments, administrator workstations 150 and 170 may also comprise a graphical user interface (GUI) 152 and 172, respectively. GUIs 152 and 172 are generally operable to tailor and filter data entered by and presented to administrator 151. GUIs 152 and 172 may comprise a plurality of displays having interactive fields, pull-down lists, and buttons operated by administrators 151 and 171. GUIs 152 and 172 may include multiple levels of abstraction including groupings and boundaries. It should be understood that the term GUIs 152 and 172 may be used in the singular or in the plural to describe one or more GUIs 152 and 172 and each of the displays of a particular GUI. It will be understood that system 100 may comprise any number and combination of administrator workstations 150 and 170. Administrators 151 and 171 utilize administrator workstations 150 and 170 to interact with SMM 140 to select templates and data associated with a strategy and/or receive visualization of strategies, as described below.

Third-party entity 130 may refer to any entity that is not associated with and is remote to enterprise 110. Third-party entities 130 are typically associated with a third-party service that provides a service to enterprise 110, administrators 151 and 171, and/or customers of enterprise 110. For example, third-party entity 130 may include a turn-key decision making system. In some embodiments, third-party entity 130 may receive information from enterprise 110. This information may allow third-party entity 130 to assist enterprise 110 in making decisions, such as, which customers of enterprise 110 should receive a credit line increase.

In some embodiments, third-party entity 130 may include module 131 that may use the information from enterprise 110 to recommend these options for enterprise 110. Module 131 may include one or more strategies 132. These strategies 132, in some embodiments, may be rules, condition statements, action statements, or a combination of any of the above that calculate key number values. Module 131 may use these key number values in order to recommend certain options and business decisions to enterprise 110. Strategies 132 may be provided by enterprise 110 to third-party entity 130 so that the key numbers are calculated based on the specific needs of enterprise 110. In some embodiments, strategy 132 may be an authorization strategy. For example, the authorization strategy may be reactive and determine whether a usage of a credit card of enterprise 110 was authorized. This may be a determination of whether the usage of the card was fraudulent or not. In some embodiments, strategy 132 may be a batch strategy. For example, this may include proactive monitoring of a portfolio of enterprise 110, such as determining which customers of enterprise 110 should receive a credit line increase.

In some embodiments, module 131 may use strategy 132 in order to calculate key numbers as written in strategy 163 by administrators 151 and 171. A key number represents a numerical value that may be assigned to customer data to represent particular information about the customer. For example, key number 275 may represent how long a customer's credit card account has been open. Continuing the example, key number 275 may be assigned 0 if the account is new, 1 if it is less than 6 months, 2 if it is more than 6 months and less than 2 years, 3 if it is more than 2 years and less than 5 years, and 4 if it is more than 5 years. Module 131 may expect certain key numbers in order to perform calculations and make business recommendations to enterprise 110. For example module 131 may expect key number 275 to have a value between 0 and 4, that value indicating the amount of time the customer's credit card account has been open. Strategies 163 are written such that a correct key value is determined for a certain key number based on information from enterprise 110 (e.g., customer data, business data, line of business data, market data, etc.). These key numbers may be used by module 131 to assist in recommending decisions to enterprise 110. For example, module 131 may use the value of key number 275 (e.g., indicating how long a customer's credit card account has been open) to make decisions on whether a customer should receive an increase in the credit card limit. In some embodiments, SMM 140 may execute strategies 163 calculate the key values using strategies 163 and communicate those key values to third-party entity 130, allowing module 131 to use those key values in making decisions for enterprise 110.

SMM 140 may refer to any suitable combination of hardware and/or software implemented in one or more modules to process data and provide the described functions and operations. In some embodiments, the functions and operations described herein may be performed by a pool of SMMs 140. In some embodiments, SMM 140 may include, for example, a mainframe, server, host computer, workstation, web server, file server, a personal computer such as a laptop, or any other suitable device operable to process data. In some embodiments, SMM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, SMM 140 communicates a plurality of templates for presentation on a first graphical user interface, receives a selection of at least one of the plurality of templates for a strategy, and communicates the strategy for execution on a remote machine. Although shown in FIG. 1 as internal to enterprise 110, it should be understood that SMM 140 may be internal or external to enterprise 110. In some embodiments, SMM 140 may include processor 155, memory 160, and interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to SMM 140, it should be understood that memory 160 may be internal or external to SMM 140, depending on particular implementations. Also, memory 160 may be separate from or integral to other memory devices to achieve any suitable arrangement of memory devices for use in system 100.

Memory 160 is generally operable to store logic 162, rules 164, templates 161, and strategies 163. Logic 162 generally refers to algorithms, code, tables, and/or other suitable instructions for performing the described functions and operations. Rules 164 generally refer to policies or directions for maintaining strategies 163. Rules 164 may be predetermined or predefined, but may also be updated or amended based on the needs of enterprise 110. Strategies 163 refer to a series of conditional and/or action statements that calculate key numbers that will be used by module 131 of third-party entity 130 to analyze customer data and determine strategy recommendations to enterprise 110. Strategies 163 may include one set for enterprise 110 or may include a unique set for each line of business in enterprise 110. For example, a line of business involving customer loans may require a different set of strategies than a line of business involving information technology and security. Templates 161 may be a conditional statement, action statement, calculation, piece of data, or function that is used to facilitate writing and editing strategies 163. Templates 161 may be created by enterprise 110 or a specific line of businesses within enterprise 110. Templates may be viewed by administrators 151 and 171 on GUIs 152 and 172 when editing or writing strategies 163. Templates are created to enable front-end editing of strategies 163 and to provide a customized interface that matches the look and feel of other interfaces used by enterprise 110. Templates may provide a user-friendly way to edit, manage, and maintain strategies 163.

Memory 160 communicatively couples to processor 155. Processor 155 is generally operable to execute logic 162 stored in memory 160 to determine maintain strategies 163, according to the disclosure. Processor 155 may comprise any suitable combination of hardware and software implemented in one or more modules to execute instructions and manipulate data to perform the described functions for SMM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for SMM 140, send output from SMM 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows SMM 140 to communicate to other devices. Communication interface 165 may include any suitable software operable to access data from various devices such as administrator workstations 150 and 170. Communication interface 165 may also include any suitable software operable to transmit data to various devices such as administrator workstations 150 and 170. Communication interface 165 may include one or more ports, conversion software, or both. In general, communication interface 165 communicates the plurality of templates for presentation on a graphical user interface, receives a selection of at least one of the plurality of templates for a strategy, and communicates the strategy for execution on a remote machine.

In some embodiments, SMM 140 stores a plurality of templates 161. These templates may be created by administrators 151 and 171 or any other employee or vendor of enterprise 110. In some embodiments, templates 161 may be designed to correspond to an interface typically used by administrators 151 and 171 within enterprise 110 or a specific line of business of enterprise 110. In some embodiments, templates may include conditional statements. For example, a template may include "if," "all of the following statements are true," "some of the following statements are true," or "none of the following statements are true." In some embodiments, templates 161 may also include action statements. For example, after some conditional statements, a template may include "then" setting a key number to a specific value. In some embodiments, templates may include mathematical operations (e.g., subtraction, multiplication), comparisons, calculations, determinations, or any other action that may be helpful to have to facilitate writing strategies 163. Templates 161 may include a number of functions including converting a string to an integer, determining a date difference (e.g., by day, month, or year), rounding a number, truncating a number, or substituting a string. In these templates 161, if there is any error, administrators 151 and 171 may set a default value for the outcome of the function. By combining various templates, administrators 151 and 171 have the ability to edit and maintain strategies 163 such that strategies 163 may be executed by a third-party entity 130 in order to make business decisions or suggestions to enterprise 110.

In some embodiments, SMM 140 communicates to workstations 150 and 170 the plurality of templates 161 for presentation on GUIs 152 and 172. The plurality of templates 161 may be presented within strategy 163 as options that administrators 151 and 171 may choose or select. For example, FIG. 2A illustrates an example strategy 200A that presents a plurality of templates 161 as drop-down menus. Strategy 163 may include the strategy name, the strategy number, priority, the date and the version number. Within the strategy there may be multiple templates 161 available to be selected by administrators 151 and 171. For example, FIG. 2 illustrates a plurality of templates 161 at reference numerals 201, 202, 203, 204 and 205. Templates 161, in some embodiments, may be displayed on GUIs 152 and 172 in the form of a drop-down menu that allows administrators 151 and 171 to select an appropriate template 161 when writing strategy 163. For example, at reference numeral 201, administrators 151 and 171 may choose between an "IF" (e.g., conditional statement) and a "THEN" (e.g., an action statement). By presenting a plurality of templates 161, administrators 151 and 171 can write strategy 163 that sets the key number to a specific value. SMM 140 may communicate plurality of templates 161 to one or both GUIs 152 and 172. In some embodiments, only one administrator 151 or 171 may have strategy 163 open with the plurality of templates 161 displayed. For example, administrator 151 may open strategy 163 to view plurality of templates 161 on GUI 152. After administrator 151 closes and/or saves strategy 163, it may then be available to administrator 171 to be viewed and edited using GUI 172. In some embodiments, SMM 140 will communicate strategy 163 and plurality of templates 161 to GUIs 152 and 172 at the same time. This will allow for both administrators 151 and 171 to edit strategy 163 simultaneously.

In some embodiments, SMM 140 receives a selection of at least one of the plurality of templates 161 for strategy 163. For example, administrators 151 and 171 may click within GUI 152 or 172 to select which template 161 to use in strategy 163. In some embodiments, administrators 151 and 171 may select multiple templates for strategy 163. In FIG. 2A, for example, administrators 151 and 171 may select a template from each of those marked by reference numerals 201, 202, 203, 204 and 205. FIG. 2B illustrates a completed strategy 163 after multiple templates 161 have been selected. In general, strategy 200B may be used to determine how long a card has been open by determining the processing date, the card opened date, and whether the difference between the two dates is less than one month. If the strategy determines that the card has been open for less than one month, then the key number is set to zero.

In some embodiments, SMM 140 communicates strategy 163 for execution on a remote machine. SMM 140 may communicate strategy 163 from interface 165 to third-party entity 130 via network 120. A remote machine may be any computer, module, processor, or device remote to enterprise 110, for example, third party entity 130. Third-party entity 130 may save strategy 163 in module 131 as strategy 132. Strategy 132 may represent a completed and finalized strategy that is ready for execution. Third-party entity 130 may execute strategy 132 such that module 131 may provide business recommendations to enterprise 110. In some embodiments, SMM 140 may communicate strategy 163 to third-party entity 130 after receiving a command from workstations 150 and 170.

In some embodiments, SMM 140 stores strategy 163 on a local machine and executes strategy 163 on a local machine. SMM 140 may store strategy 163 in SMM 140, in memory 160, at workstations 150 and 170, or in any suitable storage device within enterprise 110. By storing and executing strategy 163, administrators 151 and 171 may be able to test strategy 163 to determine whether it operates correctly. In some embodiments, SMM 140 can store and execute strategy 163 before communicating strategy 163 for execution by a third-party entity 130.

In some embodiments, SMM 140 receives equation data associated with the selection of at least one of the plurality of templates 161. For example, the equation data may be an operator (e.g., addition, multiplication, subtraction, division), a numeric value, or a specific function. FIG. 2A shows an example of this equation data will be shown at reference numeral 206. At 206, administrators 151 and 171 may enter a value rather than choosing among a plurality of templates 161. FIG. 2B shows that the additional value of "1 (month)" was entered in strategy 200B. By receiving equation data associated with the plurality of templates 161 SMM allows administrators 151 and 171 to have additional control and flexibility when writing strategy 163.

In some embodiments, SMM 140 stores a version number and date associated with the strategy. As an example, FIGS. 2A and 2B both show a date of Jan. 6, 2015 and a version of 1.36. Saving these version numbers and the most recent editing date allows administrators 151 and 171 to validate the strategies and to determine that the most updated strategy is being further editing, tested, or communicated to third-party entity 130.

In some embodiments, SMM 140 receives an approval of strategy 163 and, in response to receiving the approval of the strategy, communicates strategy 163 for execution by third-party entity 130. SMM 140 may receive the approval and communicate strategy 163 from interface 155 on network 120. SMM 140 may receive approval from workstations 150 and 170. In some embodiments, approval of strategy 163 may only be received from a workstation that has not previously edited strategy 163. For example, if administrator 151 writes strategy 163 at workstation 150, then approval must be received from administrator 171 at workstation 170. This approval method requires that each strategy 163 is reviewed by at least one other person before it is sent to third-party entity 130. This approval process ensures that strategy 163 is finalized, has been tested, and is complete before sending the final version to third-party entity 130.

Modifications, additions, or omissions may be made to the systems described herein without departing from the scope of the invention. For example, system 100 may include any number of third-party entities 130, networks 120, administrator workstations 150 and 170, and SMMs 140. As another example, particular functions, such as executing strategies 163 may be performed by a separate component and SMM 140 receives the results of the execution of strategies 163. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 3 illustrates an example flow chart 300 to facilitate maintenance of strategies 163. The method begins at step 302 where SMM 140 stores a plurality of templates 161. SMM 140 may store templates 161 in memory 160, at workstations 150 and 170, or with any suitable storage devices in enterprise 110. At step 304, SMM 140 communicates the plurality of templates 161 to workstations 150 and/or 170 for presentation on GUIs 152 and 172. An example of how the plurality of templates may be presented is shown in FIG. 2A. SMM 140 may contain any number of templates 161. Each template 161 may also be further edited and revised at any time. In some embodiments, administrators 151 and 171 write and edit templates 161 to facilitate writing strategy 163. These templates represented on GUI 152 and 172 may conform to a specific look and feel of enterprise 110 such that editing strategies 163 is user-friendly.

At step 306, in some embodiments, SMM 140 receives a selection of at least one of the plurality of templates 161 for strategy 163. In some embodiments, administrators 151 and/or 171 use a mouse to click on any specific template presented on GUI 152. For example, administrator 151 may choose template entitled "processing date" at 203 and "card open date" at 204. At step 308, in some embodiments, SMM 140 determines whether it has received additional selections from the plurality of templates 161. SMM 140 may wait for a certain amount of time to determine whether it has received any additional selections from the plurality of templates 161. In some embodiments, SMM 140 may continuing determining whether any additional selections have been made until administrator 151 and 171 saves and/or closes strategy 163. If, at step 308, SMM 140 continues to receive additional selections from the plurality of templates 161, SMM 140 may continue to determine whether additional selections are being made at step 308 until it determines that no additional selections have been received. If SMM 140 determines no additional selections have been received, then the method continues to step 310.

At step 310 in some embodiments, SMM 140 receives equation data associated with the selection of at least one of the plurality templates 161. This equation data may be operating symbols, any numerical values, comments in the strategy or any other data that needs to be input to ensure strategy 163 can calculate the key value accurately. By receiving this equation data, SMM 140 provides an adaptable strategy 163.

At step 312, in some embodiments, SMM 140 stores a version number and date associated with strategy 163. SMM 140 may store a version number and date within strategy 163 or as a separate piece of data or file within memory 160. The version number may signify how many times strategy 163 has been edited, increasing its number with each check out and or saved instance of strategy 163. The date associated with strategy may be the most recent date that the strategy 163 has been edited and/or checked out by one or more administrators 151 and 171. By storing the version number and date associated with strategy 163, SMM 140 may provide the most recent and updated strategy 163 as well as illustrate how many times strategy 163 has been edited or changed.

At step 314 and 316, SMM 140 stores strategy 163 on a local machine and executes strategy 163 on the local machine, respectively. Local machine may be memory 160, SMM 140, and/or at workstations 150 and 170. In some embodiments, SMM 140 may execute strategy 163 on the local machine. In some embodiments, processor 155 may execute strategy 163. The local machine may be any machine within enterprise 110 (e.g., that is not remote to enterprise 110). Executed strategy 163 may be a simulation of how third-party entity 130 would execute strategy 132 in module 131. By storing and executing the strategy on a local machine, administrators 151 and 171 are able to review, test, and evaluate strategy 163 to ensure it operates correctly.

At step 318, SMM 140 communicates strategy 163 to a second computer for presentation on a GUI. In some embodiments, SMM 140 will communicate strategy 163 from interface 155 to workstations 150 and 170 via network 120. In some embodiments, SMM 140 communicates strategy 163 to workstations 150 or 170 that have not previously edited strategy 163. For example, if administrator 171 has previously written or edited strategy 163, SMM 140 will communicate the saved and finalized strategy 163 to workstation 150 (and administrator 151) for final approval. In some embodiments SMM 140 will communicate strategy 163 to a leader or head of enterprise 110 or specific line of business within enterprise 110.

At step 320, in some embodiments, SMM 140 receives approval of strategy 163. SMM 140 may receive approval of strategy 163 at interface 165 from one or more workstations 150 and 170 via network 120. At step 321, SMM 140 stores strategy 163 that was approved in step 320. SMM 140 may store strategy 163 in memory 160, workstations 150 and/or 170, or any other storage device within enterprise 110. In some embodiments, SMM 140 may store strategy 163 with a date and version number associated with any change. Storing strategy 163 after approval allows for historical preservation and version control. At step 322, in some embodiments, in response to receiving approval of strategy 163 at step 320, SMM 140 communicates strategy 163 for execution at third-party entity 130. SMM 140 will communicate strategy 163 from interface 165 to third-party entity 130 via network 120. Third-party entity 130 may save strategy 163 as strategy 132 and execute strategy 132 in module 131. Once SMM 140 communicates strategy 163 to third-party entity 130, then method ends.

Modifications, additions, or omissions may be made to the methods described herein without departing from the scope of the invention. For example, the steps may be combined, modified, or deleted where appropriate, and additional steps may be added. In an embodiment where SMM 140 receives approval of strategy 163 at step 320, SMM 140 may omit step 318 of communicating the strategy to a second computer for presentation on a second graphical user interface. As another example, steps 314 and 316 regarding testing of the strategy may be omitted. Additionally, the steps may be performed in any suitable order without departing from the scope of the present disclosure. While discussed as SMM 140 performing the steps, any suitable component of system 100 may perform one or more steps of the method.

Certain embodiments of the present disclosure may provide one or more technical advantages. In certain embodiments, a system is operable to receive a selection of one of a plurality of templates for a strategy and communicate the strategy for execution on a remote machine. This technique allows the enterprise to create, edit, and manage a strategy internally before sending to third-party entity. Thus, this technique conserves bandwidth and memory that would be consumed by communicating each change to a strategy to the third-party entity and requiring the third-party to create, edit, and manage a strategy. In certain embodiments, a system is operable to store and execute a strategy on a local machine to the enterprise. This technique allows the enterprise to test and edit a strategy internally before sending to a third-party entity, thus conserving bandwidth and memory that would be consumed by requiring the third-party entity to test the strategy and report back to the enterprise after each test.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A strategy-maintenance system, comprising:
a memory operable to store:
a plurality of templates, wherein a template comprises a statement that facilitates writing one or more strategies; and
at least one key number, the key number representing customer data, wherein the key number is associated with a key value and at least one strategy;
an interface operable to:
communicate to a first computer the plurality of templates for presentation on a first graphical user interface;
receive a first selection of at least one of the plurality of templates for a strategy, the strategy being associated with the key number, wherein the strategy is operable to calculate the key value associated with the key number based on at least one of the plurality of templates;
receive an input value for the strategy;
communicate the strategy for execution on a remote machine; and
a processor communicatively coupled to the interface and the memory, the processor operable to:
determine whether the strategy has received at least one of the first selection and the input value in a time period;
in response to determining that the strategy has not received at least one of the first selection and the input value in the time period, retrieve equation data associated with the first selection;
determine whether a first template of the plurality of templates contains an error;
in response to determining that the first template contains an error, assign a default value for the first template;
determine that the first computer has edited the strategy;
in response to determining that the first computer has edited the strategy, automatically instruct the interface to communicate the strategy to the second computer;
determine whether a second computer has edited the strategy;
in response to determining that the second computer has not edited the strategy, instruct the interface to communicate the strategy to the second computer for approval; and
execute the strategy to calculate the key value associated with the key number.

2. The system of claim 1, the memory further operable to store the strategy on a local machine and wherein the processor executes the strategy for testing.

3. The system of claim 1, the interface further operable to:
receive a second selection of at least one of the plurality of templates for the strategy; and
receive equation data associated with the first selection of at least one of the plurality of templates and the second selection of at least one of the plurality of templates.

4. The system of claim 1, the memory further operable to store a version number and date associated with the strategy.

5. The system of claim 1, the interface further operable to:
communicate the strategy to the second computer for presentation on a second graphical user interface;
receive an approval of the strategy; and
in response to receiving the approval of the strategy, communicate the strategy for execution on the remote machine.

6. The system of claim 1, wherein the first selection of at least one of the plurality of templates is one of a group consisting of a conditional statement and an action statement.

7. The system of claim 1, wherein the strategy is one of a group consisting of an authorization strategy and a batch strategy.

8. A non-transitory computer readable storage medium comprising logic, the logic, when executed by a processor, operable to:
   store a plurality of templates, wherein a template comprises a statement that facilitates writing one or more strategies;
   store at least one key number, the key number representing customer data, wherein the key number is associated with a key value and at least one strategy;
   communicate to a first computer the plurality of templates for presentation on a first graphical user interface;
   receive a first selection of at least one of the plurality of templates for a strategy, the strategy being associated with the key number, wherein the strategy is operable to calculate the key value associated with the key number based on at least one of the plurality of templates;
   receive an input value for the strategy;
   determine whether the strategy has received at least one of the first selection and the input value in a time period;
   in response to determining that the strategy has not received at least one of the first selection and the input value in the time period, retrieve equation data associated with the first selection;
   determine whether a first template of the plurality of templates contains an error;
   in response to determining that the first template contains an error, assign a default value for the first template;
   determine that the first computer has edited the strategy;
   in response to determining that the first computer has edited the strategy, automatically instruct the interface to communicate the strategy to the second computer;
   execute the strategy on a local machine to calculate the key value associated with the key number;
   determine whether a second computer has edited the strategy;
   in response to determining that the second computer has not edited the strategy, instruct the interface to communicate the strategy to the second computer for approval; and
   communicate the strategy for execution on a remote machine.

9. The computer readable storage medium of claim 8, the logic further operable to:
   store the strategy on a local machine; and
   execute the strategy on a local machine for testing.

10. The computer readable storage medium of claim 8, the logic further operable to:
    receive a second selection of at least one of the plurality of templates for the strategy; and
    receive equation data associated with the first selection of at least one of the plurality of templates and the second selection of at least one of the plurality of templates.

11. The computer readable storage medium of claim 8, the logic further operable to store a version number and date associated with the strategy.

12. The computer readable storage medium of claim 8, the logic further operable to:
    communicate the strategy to the second computer for presentation on a second graphical user interface;
    receive an approval of the strategy; and
    in response to receiving the approval of the strategy, communicate the strategy for execution on the remote machine.

13. The computer readable storage medium of claim 8, wherein the first selection of at least one of the plurality of templates is one of a group consisting of a conditional statement and an action statement.

14. A strategy-maintenance method, comprising:
    storing a plurality of templates, wherein a template comprises a statement that facilitates writing one or more strategies;
    storing at least one key number, the key number representing customer data, wherein the key number is associated with a key value and at least one strategy;
    communicating to a first computer the plurality of templates for presentation on a first graphical user interface;
    receiving a first selection of at least one of the plurality of templates for a strategy, the strategy being associated with the key number, wherein the strategy is operable to calculate the key value associated with the key number based on at least one of the plurality of templates;
    receiving an input value for the strategy;
    determining whether the strategy has received at least one of the first selection and the input value in a time period;
    in response to determining that the strategy has not received at least one of the first selection and the input value in the time period, retrieving equation data associated with the first selection;
    determining whether a first template of the plurality of templates contains an error;
    in response to determining that the first template contains an error, assigning a default value for the first template;
    determining that the first computer has edited the strategy;
    in response to determining that the first computer has edited the strategy, automatically instructing the interface to communicate the strategy to the second computer;
    executing the strategy to calculate the key value associated with the key number;
    determining whether a second computer has edited the strategy;
    in response to determining that the second computer has not edited the strategy, instructing the interface to communicate the strategy to the second computer for approval; and
    communicating the strategy for execution on a remote machine.

15. The method of claim 14, further comprising:
    storing the strategy on a local machine; and
    wherein executing the strategy is performed on a local machine for testing.

16. The method of claim 14, further comprising:
    receiving a second selection of at least one of the plurality of templates for the strategy; and
    receiving equation data associated with the first selection of at least one of the plurality of templates and the second selection of at least one of the plurality of templates.

17. The method of claim 14, further comprising storing a version number and date associated with the strategy.

18. The method of claim 14, further comprising:
    communicating the strategy to the second computer for presentation on a second graphical user interface;

receiving an approval of the strategy; and in response to receiving the approval of the strategy, communicating the strategy for execution on the remote machine.

19. The method of claim 14, wherein the first selection of at least one of the plurality of templates is one of a group consisting of a conditional statement and an action statement.

20. The method of claim 14, wherein the strategy is one of a group consisting of an authorization strategy and a batch strategy.

* * * * *